Patented Nov. 3, 1942

2,300,727

UNITED STATES PATENT OFFICE 2,300,727

IRRADIATION OF SEEDS

Vernon B. Durling, Corona, N. Y., assignor, by mesne assignments, to Point-Ray Corporation, New York, N. Y.

No Drawing. Application March 15, 1939, Serial No. 261,959

11 Claims. (Cl. 47—58)

This invention relates to the irradiation of seeds and especially to the treatment of seeds with infra-red rays.

Although various processes and treatments have been devised for the purpose of preventing and curing diseases to which seeds are subject, very little progress has heretofore been made in the treatment of seeds prior to planting for the purpose of increasing the percentage of germination and for decreasing the time required for germination after planting.

It is an object of the present invention to improve the germination of seeds, that is, to increase the percentage of seeds which germinate, to decrease the time required for germination after planting and to increase the strength and health of the resulting plants.

Through extensive research, I have discovered that the foregoing and other objects may be achieved by irradiating the seeds with infra-red rays of appropriate intensity and with proper length of exposure, and that of the entire infra-red region, the infra-red band most useful for my purposes is that between about 7500 and 15,000 Angstrom units, although a larger band between about 7500 and 28,000 Angstroms can be used if the peak of the radiant energy is below about 15,000 Angstroms. As will later be shown, the improvement in germination resulting from this invention is very marked, and my observations indicate that the extremes or limiting wavelengths of the band employed are not ordinarily critical within roughly ten percent (10%).

The apparatus required to treat seeds in accordance with the method of my invention may be quite simple, and may comprise, for example, a suitable infra-red ray generator or lamp, a table or surface upon which to support a seed tray, and a standard or support, preferably adjustable in height, to support the infra-red ray generator at the proper distance above the seed table.

In addition there should be provided a switch or equivalent means to turn the infra-red rays on and off, and a stop watch or automatic timer to determine the length of exposure.

In practicing the method of this invention, an infra-red ray lamp of the incandescent type having a concentrating reflector may preferably be used, and the following procedure employed: First, the height of the lamp above the table should be adjusted until the visible rays (there are usually some visible light rays present in the output of such lamps) are focused on the seed table to the smallest and most clearly defined spot. In the tests later to be described the distance between the plane of the lamp filament and the surface of the table was 11 inches, after such adjustment had been made, and the focused spot of light was about 5 inches in diameter. The lamp is next switched off, or the rays intercepted, and a tray of seeds to be treated is placed on the table where the spot of light was focused. The seeds should be arranged in a layer one seed deep. The lamp is then switched on, the seeds exposed for half of the prescribed time, the lamp extinguished, the seeds turned over on their opposite sides and again exposed for the other half of the prescribed time, after which the lamp may be switched off and the seeds removed.

For treating seeds in reasonably small quantities, the above-described apparatus is entirely satisfactory, but apparatus suitable for handling a large quantity of seeds and for automatically timing the exposure and rotating the seeds or exposing them simultaneously on both sides can readily be devised.

The infra-red ray lamp employed in the treatment of seeds according to my invention may preferably be of the gas-filled incandescent "spotlight" type having a concentrated tungsten filament enclosed in a glass bulb with a reflecting coating on the inside of the bulb wall so shaped as to throw a concentrated beam, the filament being positioned substantially in the focal plane of the reflecting surface. Such lamps may consume about 385 watts at 120 volts, the infra-red energy radiated may have a maximum peak at approximately 10,000 Angstroms, and, at a distance of about 11 inches from the filament the lamp may concentrate on a spot of about 19.6 square inches infra-red ray energy of the order of 50 watts.

By way of illustration a few tables showing the results of treatment of seeds according to my invention are given below, the comparative test having been made in each case with seed from the same lot, half of such seed having been untreated and the other half exposed to infra-red radiation as above described and for the length of time indicated.

COTTON SEED
*Percent germination*

| Days after planting | 6 | 7 | 8 | 9 | 10 | 11 | 12 | 14 | Total |
|---|---|---|---|---|---|---|---|---|---|
| | | | | | | | | | Per cent |
| Treated 20 seconds | 10 | 20 | 40 | 50 | 80 | 100 | | | 100 |
| Untreated | | | | | 10 | 20 | | 30 | 30 |

FLINT CORN
*Percent germination*

| Days after planting | 7 | 8 | 9 | 10 | 13 | Total |
|---|---|---|---|---|---|---|
| | | | | | | Per cent |
| Treated 20 seconds | 50 | 60 | 60 | 60 | 90 | 90 |
| Untreated | 10 | 30 | 40 | 50 | 50 | 50 |

BEANS
*Percent germination*

| Days after planting | 7 | 8 | 9 | 10 | 13 | Total |
|---|---|---|---|---|---|---|
| | | | | | | Per cent |
| Treated 20 seconds | 60 | 100 | | | | 100 |
| Untreated | | 20 | | | 40 | 40 |

Of the foregoing seeds the cotton seed was nearly white, the corn yellow and the beans black. The seeds selected for these tests would normally be rated "low quality" in the trade. The cotton seed was old, diseased and had been commercially rated at 37% germination. While the beans did not show disease, they were at least 4 years old, having been imported from Italy.

The following tests were made with exposures of 10 seconds and with diseased corn, as indicated:

FLINT CORN (*Penicillium fungus*)
*Percent germination*

| Days after planting | 10 | 11 | 12 | 13 | 15 | 16 | 17 | Total |
|---|---|---|---|---|---|---|---|---|
| | | | | | | | | Per cent |
| Treated 10 seconds | 30 | 40 | 50 | 60 | 70 | | | 70 |
| Untreated | | | 10 | | 12 | | 22 | 22 |

FLINT CORN (*Fusarium fungus*)
*Percent germination*

| Days after planting | 8 | 9 | 10 | Total |
|---|---|---|---|---|
| | | | | Per cent |
| Treated 10 seconds | 90 | 100 | | 100 |
| Untreated | 60 | | 70 | 70 |

In all of the foregoing tests, the "Total" germination was determined after the ungerminated seeds had rotted.

Most good quality seeds of flowers and vegetables have an average germination of about 90% when strong and fresh, but become progressively weaker with storage so that after 2 or 3 years the germination will drop to about 40%. However whether the weakness, with resulting decrease in germination, is due to age, disease or other defect, the irradiation of such seeds by my method usually restores the original percentage of germination and frequently exceeds it. Furthermore, the plants which grow from these irradiated weak seeds are strong and healthy, whereas the plants which grow from weak, untreated seeds tend to be weak and unproductive and frequently die.

Seed infected with a fungus disease will usually germinate, but the resulting plant may be weak and usually will produce weak, low quality, diseased seeds. With certain seeds, however, notably cotton, an external fungus infection usually dies within about two years without harming the seeds, so that the present practice is to store cotton seed for about 2 or 3 years before planting it. Since the method of my invention improves the germination of seeds whether they were previously infected or not, its utilization obviates the necessity of storing seeds and thus allows them to be released at once for planting, and with greatly improved germination and growth.

Another useful aspect of this invention resides in the combination of the above-described method with any of the well known chemical dips or baths frequently employed for controlling and killing seed diseases. For example, it is customary to treat seeds with chemical solutions to kill fungus diseases, after which a drying operation is required. Such treatment does no more than kill the fungus and does not stimulate germination. However, by combining the method of the present invention with the practice of chemical dipping, the seeds can be dipped and then conveyed on a moving belt, beneath infra-red ray lamps as above described, whereby the chemical solution is rapidly dried and the seeds are simultaneously irradiated by infra-red rays with attendant improvement in germination. In such a process the time of irradiation can readily be controlled by controlling the speed with which the seeds are carried through the infra-red rays.

Many tests of which a few examples have above been given, indicate that with practically all garden seeds, and with the grains as well, an exposure of from 10 to 20 seconds to infra-red radiation at an energy value determined by the described conditions results in maximum improved germination. As a matter of fact any exposure of from about 5 seconds to about 20 seconds results in progressively improved germination, but at the radiation rate described, exposures progressively longer than about 20 seconds result in correspondingly decreased germination. From the data given herein the correct exposure under different radiation conditions may readily be determined.

The color of the seeds undoubtedly affects the absorption of radiation, the darker the seed the more the absorption, hence indicating shorter exposure for the darker seeds, although other factors may tend to introduce a compensation. Two apparent exceptions are light-colored corn seeds which appear to derive the maximum effect with a shorter exposure than most other seeds, and dark colored cotton seeds which require a long exposure. The thickness and nature of the outer layer or shell apparently makes some difference, as, for example, is the case with cotton seed which has a hard shell and is covered with a white fuzz and requires a longer exposure than does corn. However, since a slight "overexposure" is not in general detrimental, the rule given is reliable.

It should be understood that the foregoing examples and descriptions of the methods of my invention, of apparatus for practicing it, and of results achieved therefrom, are given only by way of illustration, and that modifications and variations all within the spirit of my invention will be obvious to those skilled in the art.

I claim:

1. The method of improving the germination of seeds which comprises exposing said seeds to infra-red rays having a wavelength band of between approximately 7,500 and 28,000 Angstrom units and an energy peak in the neighborhood of 10,000 Angstrom units.

2. The method of improving the germination of seeds which comprises exposing one side of said seeds to infra-red rays having a wavelength band of between approximately 7,500 and 28,000 Angstrom units and an energy peak in the neighborhood of 10,000 Angstrom units for a period of from 3 to 10 seconds, turning said seeds over and exposing them on the opposite side to said rays for a period of from 3 to 10 seconds.

3. The method of improving the germination of seeds which comprises exposing said seeds to infra-red rays having a wavelength band of between approximately 7,500 and 15,000 Angstrom units and an infra-red energy value of the order of 2.5 watts per square inch, for a period of from 5 to 20 seconds.

4. The method of improving the germination of seeds which comprises exposing one side of said seeds to infra-red rays having a wavelength band of between approximately 7,500 and 28,000 Angstrom units and an infra-red energy value of the order of 2.5 watts per square inch, for a period of from 3 to 10 seconds, turning said seeds over and exposing them on the opposite side to said rays for a period of from 3 to 10 seconds.

5. The method of improving the germination of seeds which comprises exposing one side of said seeds to infra-red rays having a wavelength band of between approximately 7,500 and 15,000 Angstrom units for a period of from 3 to 10 seconds, and subsequently exposing said seeds on the opposite side to said rays for a period of from 3 to 10 seconds.

6. The method of improving the germination of seeds which comprises exposing one side of said seeds to infra-red rays having a wavelength band of between approximately 7,500 and 15,000 Angstrom units and an infra-red energy value of the order of 2.5 watts per square inch, for a period of from 3 to 10 seconds, and subsequently exposing said seeds on the opposite side to said rays for a period of from 3 to 10 seconds.

7. The method of improving the germination of seeds which comprises exposing said seeds for a period of from 5 to 20 seconds to infra-red rays having a band of between approximately 7,500 and 28,000 Angstrom units and an infra-red energy value of the order of 2.5 watts per square inch.

8. The method of treating seeds which comprises moistening said seeds with a chemical bath, and thereafter drying them by irradiating said seeds for a period of from 5 to 20 seconds with infra-red rays having a wavelength band lying between the limits of approximately 7,500 and 28,000 Angstrom units and an energy peak in the neighborhood of 10,000 Angstrom units.

9. The method of treating seeds which comprises moistening said seeds with a chemical bath, and thereafter drying them by irradiating said seeds for a period of from 5 to 20 seconds with infra-red rays having a wavelength band lying between the limits of approximately 7,500 and 15,000 Angstrom units and an infra-red energy value of the order of 2.5 watts per square inch.

10. The method of controlling fungus and improving the germination of seeds which comprises moistening said seeds with a fungus-controlling chemical bath, and prior to planting, irradiating said seeds with infra-red rays having a wavelength band lying between the limits of approximately 7,500 and 28,000 Angstrom units for a time sufficient to dry said seeds.

11. The method of improving the germination of seeds which comprises exposing said seeds on each side thereof for a period of from 5 to 20 seconds to infra-red rays having a band of between approximately 7,500 and 28,000 Angstrom units and an infra-red energy value of the order of 2.5 watts per square inch.

VERNON B. DURLING.